(12) United States Patent
Wang et al.

(10) Patent No.: US 10,198,009 B2
(45) Date of Patent: Feb. 5, 2019

(54) VEHICLE AUTOMATION AND OPERATOR ENGAGMENT LEVEL PREDICTION

(71) Applicant: GM GLOBAL TECHNOLOGY OPERATIONS LLC, Detroi, MI (US)

(72) Inventors: Peggy Wang, Shanghai (CN); Roy J. Mathieu, Rochester Hills, MI (US); Joseph F. Szczerba, Grand Blanc, MI (US); Gary P. Bertollini, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 122 days.

(21) Appl. No.: 15/406,301

(22) Filed: Jan. 13, 2017

(65) Prior Publication Data

US 2017/0212525 A1    Jul. 27, 2017

Related U.S. Application Data

(60) Provisional application No. 62/287,423, filed on Jan. 26, 2016.

(51) Int. Cl.
*G05D 1/02* (2006.01)
*B60W 40/08* (2012.01)
*G01C 21/34* (2006.01)
*G05D 1/00* (2006.01)
*G01C 21/36* (2006.01)

(52) U.S. Cl.
CPC .......... *G05D 1/0276* (2013.01); *B60W 40/08* (2013.01); *G01C 21/3484* (2013.01); *G01C 21/3492* (2013.01); *G01C 21/3697* (2013.01); *G05D 1/0088* (2013.01); *B60W 2040/0818* (2013.01); *G05D 2201/0213* (2013.01)

(58) Field of Classification Search
None
See application file for complete search history.

(56) References Cited

U.S. PATENT DOCUMENTS 9,796,388 B2 * 10/2017 Tseng .................... B60W 10/20
2016/0282132 A1 * 9/2016 Bostick ............. G01C 21/3415
2016/0379486 A1 * 12/2016 Taylor .................. G08G 1/0141
340/905

* cited by examiner

*Primary Examiner* — Mussa A Shaawat
*Assistant Examiner* — Michael V Kerrigan
(74) *Attorney, Agent, or Firm* — Lorenz & Kopf, LLP

(57) ABSTRACT

In one embodiment, a method comprises obtaining inputs pertaining to one or more conditions of route planned for a vehicle having autonomous operation capability; predicting, via a processor, a future level of engagement for an operator of the vehicle, using the inputs; and providing, for the operator, information pertaining to the future level of engagement.

20 Claims, 4 Drawing Sheets

VEHICLE AUTOMATION AND OPERATOR ENGAGMENT LEVEL PREDICTION

CROSS REFERENCE TO RELATED APPLICATIONS

This application claims the benefit of U.S. Provisional Application No. 62/287,423, filed Jan. 26, 2016, the entirety of which is hereby incorporated by reference herein.

TECHNICAL FIELD

The present disclosure generally relates to vehicles, and more particularly relates to methods and systems for predicting operator engagement levels for autonomous vehicles.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from systems such as global positioning systems (GPS) to navigate. Certain vehicles have different levels of autonomous driving, requiring different respective engagement levels for a driver or other operator of the vehicle. However, it may be desirable to improve an operator's experience with such a vehicle, for example by providing information regarding possible upcoming levels of operator engagement.

Accordingly, it is desirable to provide techniques for improved vehicle operation, for example by providing information regarding possible upcoming levels of operator engagement with autonomous driving capabilities. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method includes obtaining inputs pertaining to one or more conditions of route planned for a vehicle having autonomous operation capability; predicting, via a processor, a future level of engagement for an operator of the vehicle, using the inputs; and providing, for the operator, information pertaining to the future level of engagement.

Also in one embodiment, the obtaining inputs includes obtaining inputs pertaining to a plurality of conditions of the route, wherein the plurality of conditions relate to a level of automated driving expected for the route.

Also in one embodiment, the obtaining inputs includes crowd-source monitoring for the route.

Also in one embodiment, the obtaining inputs includes obtaining data analytics for the route.

Also in one embodiment, the obtaining inputs includes obtaining historical information for the route.

Also in one embodiment, the obtaining inputs includes obtaining a user history for the operator of the vehicle with respect to the operator's preferences.

Also in one embodiment, the obtaining inputs includes obtaining road conditions for the route.

Also in one embodiment, the method further includes determining a level of engagement required by the operator for the route, based at least in part on the plurality of conditions.

Also in one embodiment, the method further includes: determining a level of engagement required by the operator for a plurality of possible routes, including the route and a plurality of additional routes, based on the plurality of conditions; obtaining sensor data pertaining to the operator of the vehicle; monitoring a level of awareness of the operator of the vehicle, based on sensor data; and selecting a selected route of the plurality of possible routes, based on the level of engagement for each of the respective routes and the level of awareness of the operator.

In accordance with another embodiment, a system includes an input unit and a processor. The input unit is configured to at least facilitate obtaining inputs pertaining to one or more conditions of a route planned for a vehicle having autonomous operation capability. The processor is configured to at least facilitate predicting, via a processor, a future level of engagement for an operator of the vehicle, using the inputs; and providing, for the operator, information pertaining to the future level of engagement.

Also in one embodiment, the plurality of conditions relate to a level of automated driving expected for the route.

Also in one embodiment, the input unit is configured to at least facilitate crowd-source monitoring for the route.

Also in one embodiment, the input unit is configured to at least facilitate obtaining data analytics for the route.

Also in one embodiment, the input unit is configured to at least facilitate obtaining historical information for the route.

Also in one embodiment, the input unit is configured to at least facilitate obtaining a user history for the operator of the vehicle with respect to the operator's preferences.

Also in one embodiment, the input unit is configured to at least facilitate obtaining road conditions for the route.

Also in one embodiment, the processor is configured to at least facilitate determining a level of engagement required by the operator for the route, based at least in part on the plurality of conditions.

Also in one embodiment, the system further includes a sensor unit that is configured to at least facilitate obtaining sensor data pertaining to the operator of the vehicle; and the processor is further configured to at least facilitate determining a level of engagement required by the operator for a plurality of possible routes, including the route and a plurality of additional routes, based on the plurality of conditions; monitoring a level of awareness of the operator of the vehicle, based on sensor data; and selecting a selected route of the plurality of possible routes, based on the level of engagement for each of the respective routes and the level of awareness of the operator.

In accordance with another embodiment, a vehicle includes a propulsion system, an input unit, and a processor. The propulsion system has an autonomous operation capability. The input unit is configured to at least facilitate obtaining inputs pertaining to one or more conditions of a route planned for the vehicle. The processor is configured to at least facilitate predicting, via a processor, a future level of engagement for an operator of the vehicle, using the inputs; and providing, for the operator, information pertaining to the future level of engagement.

Also in one embodiment, the vehicle further includes a sensor unit that is configured to at least facilitate obtaining sensor data pertaining to the operator of the vehicle; and the processor is further configured to at least facilitate determining a level of engagement required by the operator for a plurality of possible routes, including the route and a plurality of additional routes, based on the plurality of conditions; monitoring a level of awareness of the operator of the vehicle, based on sensor data; and selecting a selected route of the plurality of possible routes, based on the level of engagement for each of the respective routes and the level of awareness of the operator.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
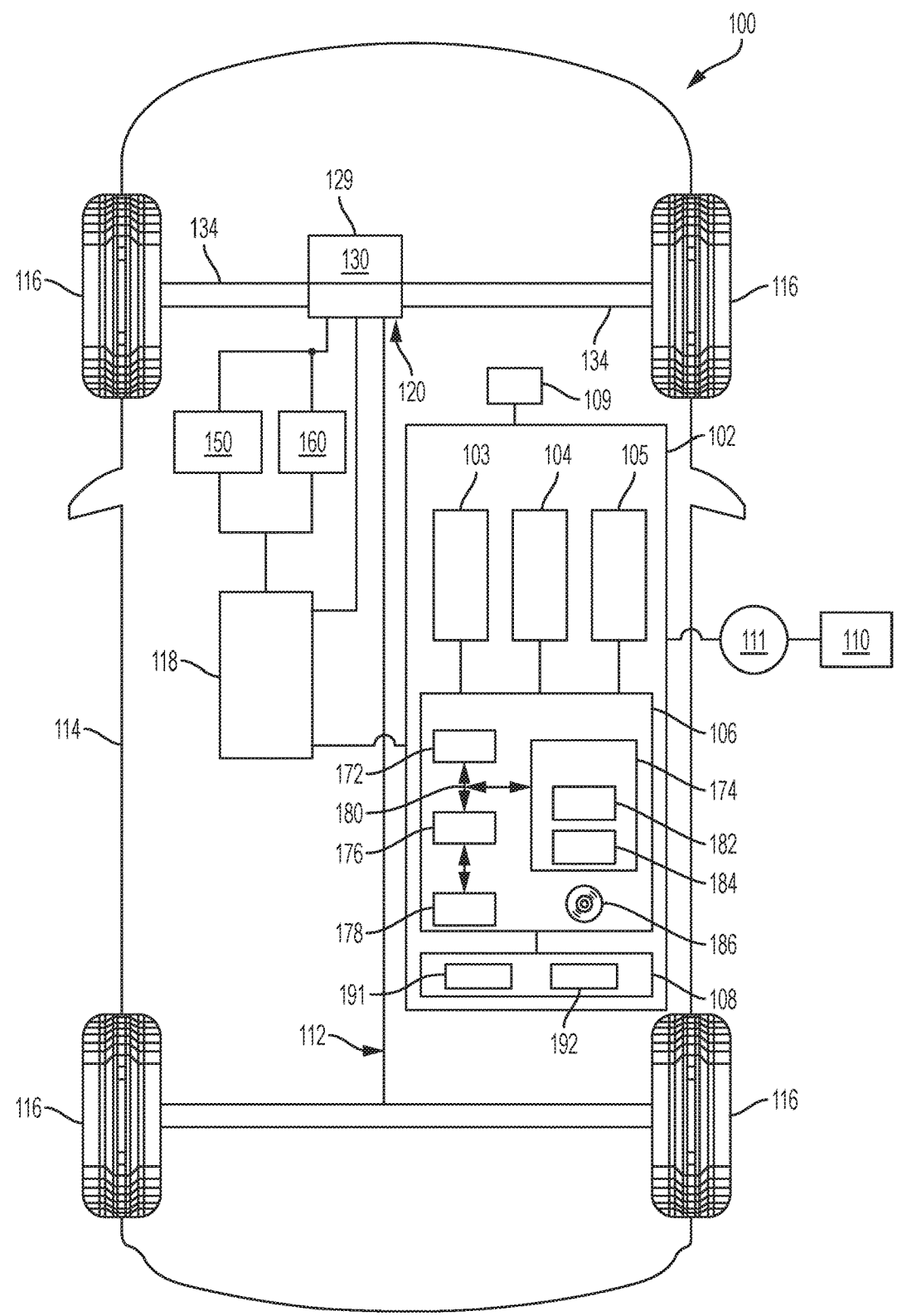
FIG. 1 is a functional block diagram of a vehicle having autonomous driving functionality, and that includes a system for providing information to an operator of the vehicle as to a level of engagement for the operator, in accordance with an exemplary embodiment.

FIG. 1 illustrates a vehicle 100, or automobile, according to an exemplary embodiment. The vehicle 100 includes multiple levels of autonomous functionality, involving different respective levels of engagement on behalf of a driver or operator of the vehicle 100. As described in greater detail further below, the vehicle 100 includes a control system 102 for providing information to the operator of the vehicle 100 as to a level of engagement for the operator. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). In one embodiment, the operator (as referred to herein) is a driver of the vehicle 100 that is seated inside the vehicle 100. In other embodiments, the operator may instead be one or more other types of operators, such as a co-pilot or assistant driver inside the vehicle, a remote operator outside the vehicle 100 (e.g. operating via some form of remote control), and so on.

In one embodiment depicted in FIG. 1, vehicle 100 includes, in addition to the above-referenced control system 102, a chassis 112, a body 114, four wheels 116, an electronic system 118, a powertrain 129, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. As depicted in FIG. 1, each wheel 116 comprises a wheel assembly that includes a tire as well as a wheel and related components (and that are collectively referred to as the "wheel 116" for the purposes of this Application). In various embodiments the vehicle 100 may differ from that depicted in FIG. 1.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine. In various other embodiments, the engine 130 may comprise an electric motor and/or one or more other transmission system components (e.g. for an electric vehicle), instead of or in addition to the combustion engine.

Still referring to FIG. 1, in one embodiment, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In various embodiments, the vehicle 100 utilizes inputs from the operator for steering (e.g. via a steering wheel) when the vehicle 100 is in a mode requiring operator steering input. Otherwise, the vehicle 100 may automatically control steering, autonomously without operator input, when in other operating modes.

The braking system 160 is mounted on the chassis 112, and provides braking for the vehicle 100. In various embodiments, the vehicle 100 utilizes inputs from the operator for braking (e.g. via a brake pedal) when the vehicle 100 is in a mode requiring operator braking input. Otherwise, the vehicle 100 may automatically control braking, autonomously without operator input, when in other operating modes. Also in one embodiment, acceleration/deceleration of the vehicle 100 may be manually controlled via the operator via manual operation of the brake pedal as well as an accelerator pedal when the vehicle 100 is in a manual mode requiring operator input, and that acceleration/deceleration of the vehicle 100 may instead be automatically controlled, autonomously without operator input, when the vehicle 100 is in an autonomous driving mode.

In one embodiment, the control system 102 is mounted on the chassis 112. As noted above and discussed in greater detail below (as well as further below in connection with FIGS. 2-4), the control system 102 provides information to the operator of the vehicle 100 as to a level of engagement for the operator, including predicted levels of driver engagement corresponding to different degrees of autonomous driving for a scheduled route for a current vehicle drive to a destination. As referred to herein, different levels of autonomous driving may correspond to different functions operated in an autonomous manner, and/or different levels automation in performing such functions, for example on various parameters to operation of the vehicle, operation and functioning of the autonomous functionality (e.g. sensors associated therewith), measures of alertness of the driver, surrounding weather and road conditions, and so on. In various embodiments, the different levels of autonomous driving may include automatic control of the steering system 150, automatic control of the braking system 160, adaptive cruise control for lateral and/or longitudinal directions, complete automated operation and control of the vehicle 100, and various other intermediate levels of automated control of one or more systems of the vehicle 100.

As depicted in FIG. 1, in one embodiment the control system 102 comprises sensors 103, transceivers 104, a user interface 105, a controller 106, and a display unit 108. The sensors 103 include various sensors that provide autonomous driving functionality for the vehicle 100 and/or monitoring of the occupant (e.g. driver) of the vehicle 100 and/or conditions surrounding the vehicle 100. In various embodiments, the sensors 103 may include, among others, ultrasonic sensors, lidar sensors, radar sensors, cameras, visible light sensors, non-visible light sensors, and/or various other sensors used for detection, identification, and/or measurements of objects, roadways, and/or conditions surrounding the vehicle 100, for autonomous operation of the vehicle 100, and/or pertaining to the vehicle 100 and/or the driver of the vehicle 100 e.g. input sensors, motion sensors, eye/head monitoring sensors, steering wheel sensors, accelerometers, and so on).

The transceivers 104 communicate with one or more devices, systems, and/or other sources of information pertaining to autonomous operation of the vehicle 100. In certain embodiments, the transceivers 104 may include wired and/or wireless transceivers and/or components thereof (e.g., in certain embodiments, separate receivers and transmitters may be used). In certain embodiments, the transceivers receive data from the sensors 103 as well as other vehicle 100 systems, via wireless (e.g. Bluetooth or other short-range wireless) and/or wired connections (e.g. a vehicle CAN bus) pertaining to the vehicle 100, operation of the autonomous functionality, and/or conditions surrounding the vehicle, and provide such data to the controller 106 for processing. In certain embodiments, the transceivers 104 also receive such data from an operator's electronic device 109 (e.g. an operator's smart phone, tablet, and/or computer product, that may be disposed onboard the vehicle) via one or more wireless and/or wired connections. In certain embodiments, the transceivers 104 also receive such data from a remote server 110 (e.g. a global positioning system (GPS) server providing vehicle 100 location information, a weather service and/or other service and/or server providing information regarding weather conditions, road conditions, road construction, traffic patterns, and so on) via a wireless network 111 (e.g. a cellular network, a global positioning system (GPS) network, and/or other wireless network).

The user interface 105 receives inputs from the operator of the vehicle 100. In various embodiments, the user interface 105 may receive input such as, by way of example only, an operator's desired travel route(s), an operator's preferences for display modes, an operator's preferences for autonomous versus non-autonomous driving at different times and/or locations, and/or various other types of operator preferences and/or other inputs. The user interface 105 provides such information to the controller 106 for processing.

The controller 106 is coupled to the sensors 103, the transceivers 104, the user interface 105, and the display unit 108. The controller 106 utilizes information from the sensors 103, the transceivers 104, and the user interface 105 to determine predicted levels of engagement required by the operator for a current vehicle drive. The controller 106 also provides the predicted levels of engagement to the operator via the display unit 108, as described further below. In various embodiments, the controller 106 determines the level of operator engagement required by analyzing how well the autonomous functionality and associated systems of the vehicle 100 are performing (e.g. how well the various sensors 103 are performing), as well as the types of roadways to be encountered (e.g. highways versus roads with stop signs and street lights, paved versus unpaved roads, traffic on various roads, construction on various roads, conditions of various roads [e.g. potholes, coefficient of friction, and so on], lane restrictions on various roads, accidents or events on the various roads, various weather conditions that may affect autonomous driving [e.g. snow, ice, rain, wind, fog, and so on], and/or various other factors that may affect autonomous driving). In one embodiment, as a general matter, the more potentially difficult that autonomous driving may become, the greater the level of engagement may be required by the driver. However, this may vary in other embodiments (e.g. in certain embodiments in which a fleet of vehicles 100 all have autonomous driving capabilities, autonomous driving may be encouraged in more difficult driving conditions to help avoid user error, and so on). In various embodiments, the controller 106, along with the sensors 103, the transceivers 104, the user interface 105, and the display unit 108, provide these and other functions in accordance with the steps and functionality described further below in connection with FIGS. 2-4.

As depicted in FIG. 1, the controller 106 comprises a computer system. In certain embodiments, the controller 106 may also include one or more of the sensors of the sensors 103, one or more other devices and/or systems, and/or components thereof. In addition, it will be appreciated that the controller 106 may otherwise differ from the embodiment depicted in FIG. 1. For example, the controller 106 may be coupled to or may otherwise utilize one or more remote computer systems and/or other systems, such as the electronic system 118 of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 172 executes one or more programs 182 contained within the memory 174 and, as such, controls the general operation of the controller 106 and the computer system of the controller 106, generally in executing the processes described herein, such as those described further below in connection with FIGS. 2-4.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensors 103. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps described further below in connection with FIGS. 2-4. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

The display unit 108 is coupled to the controller 106, and provides information as to the level of engagement required for the operator. In one embodiment, the display unit 108 provides the operator with predictions, as determined via the processer 172, as to levels of engagement required by the operator during a vehicle drive (e.g. during a current drive to a desired destination). As depicted in FIG. 1, in one embodiment, the display includes a visual component 191 and an audio component 192. However, this may vary in other embodiments. In one embodiment, the visual component 191 is visible by the driver of the vehicle 100 (e.g. on a front dash, a navigation system, and/or control panel of the vehicle 100). In addition, in one embodiment, the audio component 192 is utilized via one or more audio speakers of the vehicle 100.

It will be appreciated that the vehicle 100 can be operated in an automated manner by commands, instructions, and/or inputs that are "self-generated" onboard the vehicle itself. Alternatively or additionally, the vehicle 100 can be controlled by commands, instructions, and/or inputs that are generated by one or more components or systems external to the vehicle 100, including, without limitation: other autonomous vehicles; a backend server system; a control device or system located in the operating environment; or the like. In certain embodiments, therefore, the vehicle 100 can be controlled using vehicle-to-vehicle data communication, vehicle-to-infrastructure data communication, and/or infrastructure-to-vehicle communication, among other variations (including partial or complete control by the driver or other operator in certain modes, for example as discussed above).

Figure 2:
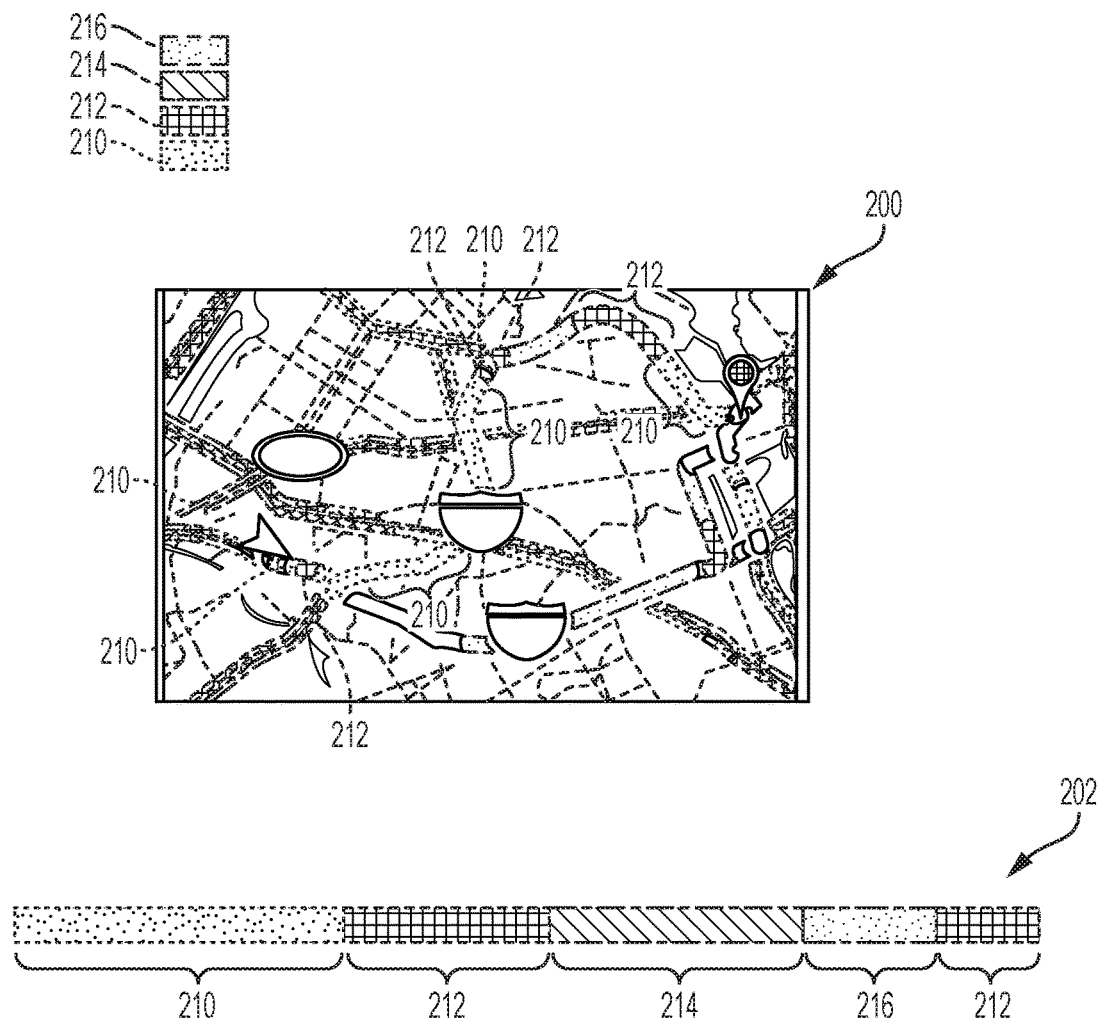
FIG. 2 is a presentation of exemplary displays that can be provided using a vehicle system, and that can be implemented in connection with the system and vehicle of FIG. 1, in accordance with an exemplary embodiment.

With reference to FIG. 2, a presentation is provided of two exemplary displays 200, 202 (referred to as the first display 200 and the second display 202, respectively) that may be presented on the display unit 108 for a presentation that may be provided via the display unit 108 (e.g. for viewing within the vehicle 100). The first display 200 provides the predicted levels of engagement along a route being taken by the vehicle 100 that is embedded along with a map of the route. The second display 202 provides the predicted levels of engagement instead via a linear presentation (with respect to time). In various other embodiments, different types of presentations may be utilized (e.g. a linear presentation with respect to distance, and so on).

In the depicted examples, the level of operator engagement is color coded on the respective displays 200, 202. For example, in accordance with one embodiment, a first color 210 (e.g. green) is used to depict road segments and/or durations of time in which little or no driver engagement is required (e.g. in which the vehicle 100 is driving in a full autonomous level five, or a near-full autonomous level four, mode of operation). Also in one embodiment, a second color 212 (e.g. yellow) is used to depict road segments and/or durations of time in which a somewhat higher level of driver engagement is required (e.g. in which the vehicle 100 is driving in an autonomous level three mode of operation, in which a driver should still be available to take over operation of the vehicle 100 if necessary). Also in one embodiment, a third color 214 (e.g. purple) is used to depict road segments and/or durations of time in which a still higher level of driver engagement is required (e.g. in which the vehicle 100 is driving in an autonomous level two mode of operation, in which driver vigilance is required). In addition, in one embodiment, a fourth color 216 (e.g. red) is used to depict road segments and/or durations of time in which a still higher level of driver engagement is required (e.g. in which the vehicle 100 is driving in an autonomous level zero or one mode of operation, in which full-time driver performance is required—for example a full manual driving mode or a limited autonomous driving mode, as a limited application of cruise control, in which full-time driver performance is still required).

Also in one embodiment, the levels of autonomous vehicle operation referenced above correspond to the SAE International standards, which include the following: (a) level zero automation refers to complete manual operation by the driver, thereby requiring full-time performance by the driver; (b) level one automation utilizes some automation (e.g., in one embodiment, adaptive cruise control for either lateral or longitudinal movement but not both, for automated control of steering or acceleration/deceleration), but still requires full time performance by the driver (e.g. the driver still performs certain driving tasks, such as either steering or acceleration/deceleration, on a full-time basis); (c) level two automation utilizes a greater degree of automation (e.g., in one embodiment, including adaptive cruise control for both lateral and longitudinal movement, for automated control of both steering and acceleration/deceleration), but still requires a degree of driving involvement (but less than levels zero and one) (for example, in one embodiment, the driver is expected to monitor the driving environment as well as to respond to any requests to intervene; (d) level three automation utilizes a greater degree of automation as compared with level two (e.g., in one embodiment, including adaptive cruise control for both lateral and longitudinal movement, for automated control of both steering and acceleration/deceleration, as well as automated monitoring of the driving environment), but still requires a degree of driving involvement (but less than level two) (for example, in one embodiment, the driver is expected to respond to any requests to intervene; (e) level four automation utilizes a still greater degree of automation (e.g., in one embodiment, including full automated control of all vehicle systems), with limited or no driver involvement (for example, in one embodiment, the driver may optionally respond to a request to intervene, but the vehicle can still be operated in a fully autonomous manner if the driver does not respond to a request to intervene); and (f) level five automation utilizes full automation of driving of the vehicle, with no requirement of driver engagement. However, this may vary in other embodiments.

Also, similar to the discussion above, in one embodiment (i) the first color 210 is used when level five or level four automation is predicted (i.e. with little or no predicted driver engagement); (ii) the second color 212 is used when level three automation is predicted (i.e. with greater predicted driver engagement as compared with level five or level four automation); (iii) the third color 214 is used when level two automation is predicted (i.e. with greater predicted driver engagement as compared with level three automation); and (iv) the fourth color 216 is used when level one or level zero automation is predicted (i.e. with full-time predicted driver engagement, that is greater than with level two automation). This may vary in different embodiments. For example, in certain embodiments, separate colors may be utilized for each automated level, and/or different display techniques may be used to designate the level of engagement (e.g. using dashed lines, dotted lines, shading, and/or various other markings and/or designations, instead of or in addition to different colors). In either case, the displays provide the driver with an expectation of the upcoming levels of engagement that are predicted along the upcoming route.

Figure 3:
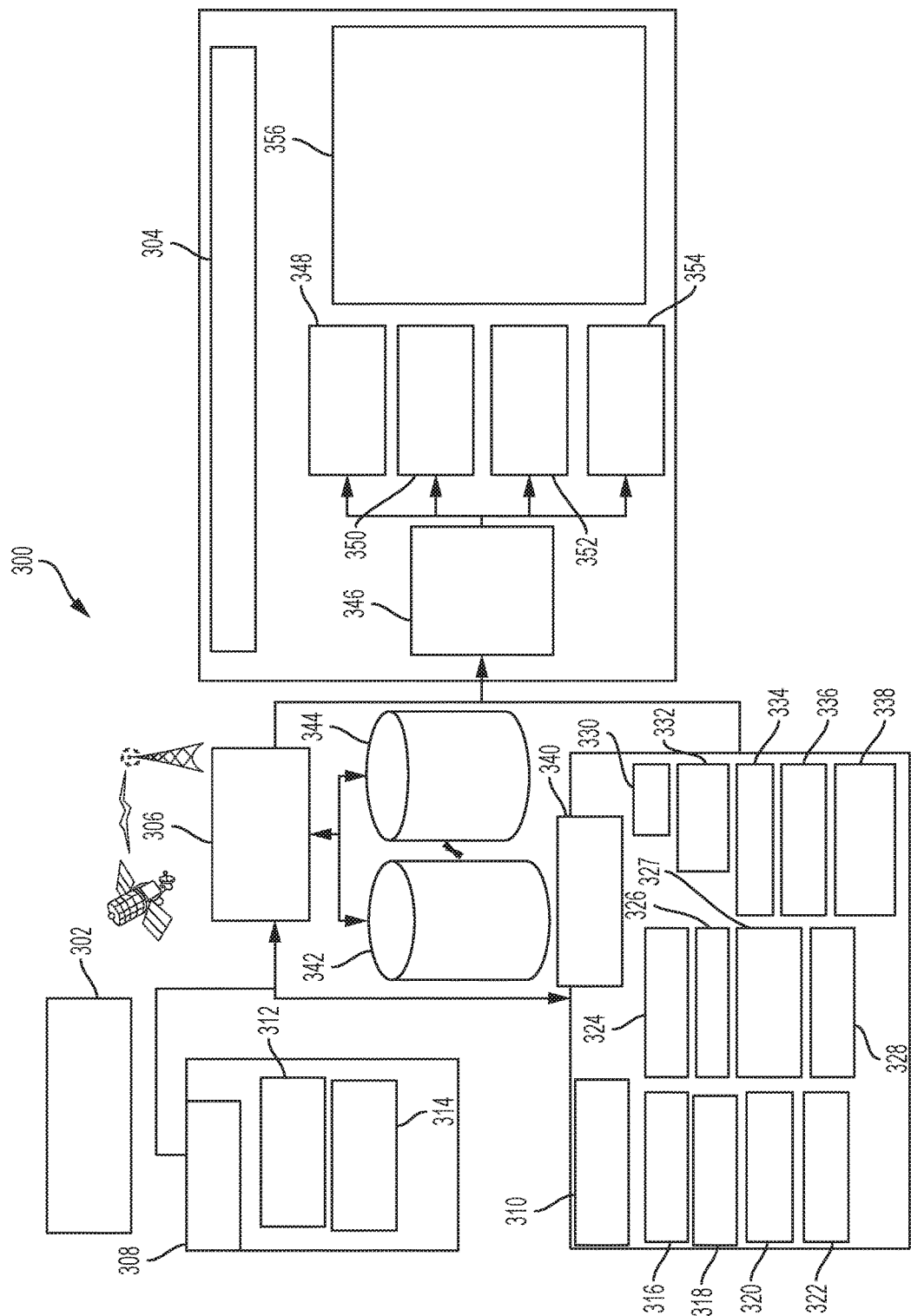
FIG. 3 is a flow diagram of a conceptual framework for providing information to an operator of the vehicle as to a level of engagement for the operator, and that can be implemented in connection with the system and vehicle of FIG. 1 and the display of FIG. 2, in accordance with an exemplary embodiment.

With reference to FIG. 3, a conceptual framework 300 is provided for providing information to an operator of the vehicle as to a level of engagement for the operator, in accordance with an exemplary embodiment. The conceptual framework 300 can be implemented in connection with the vehicle 100 and the control system 102 of FIG. 1 and the displays 200, 202 of FIG. 2, in accordance with an exemplary embodiment.

As shown in FIG. 3, in one embodiment various system inputs 302 are used to generate various system outputs 304 using one or more data communication networks 306 (e.g. including one or more satellite, cellular, and/or other wireless networks). The system inputs 302 may include both off-board inputs 308 as well as onboard inputs 310 (i.e. onboard the vehicle 100). In the depicted example, the off-board inputs 308 may include infrastructure sensors data 312 and camera data 314 from off-board the vehicle 100 (e.g. from cameras and other sensors along roadways, or as part of traffic lights, and so on). The off-board inputs 308 include information pertaining to roadways, road conditions, weather conditions, and/or other information for parameters surrounding the vehicle 100 en route to its destination. Such off-board inputs may be received, for example, via the transceivers 104 of FIG. 1.

Also as depicted in FIG. 3, in various embodiments, the onboard inputs 310 includes various different types of data for parameters pertaining to the vehicle 100, operation of the autonomous functionality, the driver of the vehicle, and/or conditions surrounding the vehicle 100. Such onboard inputs may be obtained, for example, via devices such as the following, among other possible devices: embedded cameras 316; personal devices 318 such as smart phones, tablets, or other electronic devices (e.g. corresponding to device 109 of FIG. 1) and/or sensors (e.g. cameras, accelerometers, and so on) associated with such personal devices; user input devices 320 (e.g. switches, gesture input devices, and so on, for example corresponding to the user interface 105 of FIG. 1); external cameras 324 (e.g. facing the roadway); internal cameras 326 (e.g. facing the driver); eye and/or head sensors 326 tracking eyes and/or head of the driver and/or other driver characteristics (e.g. monitoring a heart rate of the driver, and so on); steering wheel sensors 328 tracking an engagement of the steering wheel by the driver; GPS sensors and devices 330 (e.g. as part of the transceivers 104 of FIG. 1); longitudinal acceleration sensors 332, wheel speed sensors 326, and/or autonomous functionality sensors 338 (e.g. pertaining to function and/or health of various object-detection and/or other sensors, such as camera, radar, lidar, and so on, utilized for autonomous driving of the vehicle).

Also as depicted in FIG. 3, additional inputs 340 are obtained via vehicle communications with one or more structures and/or devices off-board the vehicle 100, such as via the data and communication network 306. By way of example, the additional inputs 340 may comprise various outside conditions 342 such as weather, traffic conditions, traffic signals, road conditions, road construction, and so on, as well as data servers and business logic 344 (e.g. including prior history of the driver, the vehicle, and/or the roadways, related analytics, and so on). It various embodiments, these and/or other inputs can be obtained via various forms of communications, such as vehicle to vehicle communications, vehicle to infrastructure communications, communications between the vehicle 100 and one or more remote servers and/or service providers, and so on.

In addition, as depicted in FIG. 3, in one embodiment the system outputs 304 are generated via an onboard processor 346 (e.g. corresponding to the processor 172 of FIG. 1), and include a display 348 (e.g. corresponding to the displays 202, 202 of FIG. 2), possible display override state charges 350 (e.g. if the operator requests a change to a desired route of travel, or to a level of automated driving, and so on), automation level preview calculations 352 (e.g. in determining the level of operator engagement required), system command values 354 (e.g. for autonomous operation of the vehicle), as well as other possible system features 356. As depicted in FIG. 3, the other possible system features 356 may include, among others, various displays (e.g. instrument clusters, DIC (driver information center), navigation screen, HUD (heads up display), ISRV (inside rear view) mirror, OSRV (outside rear view mirrors), audible sounds and/or vibrations, speakers, and/or actuators).

Figure 4:
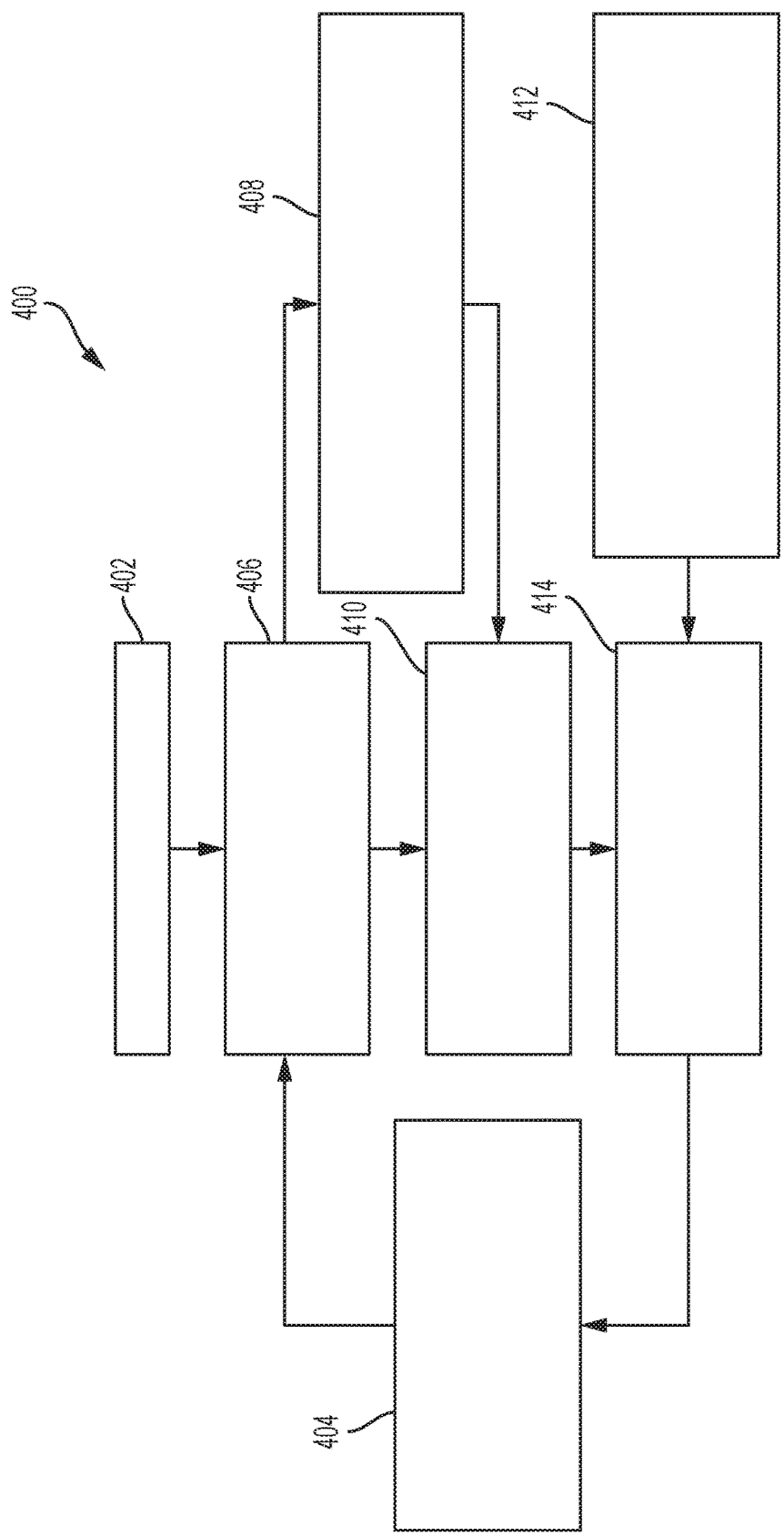
FIG. 4 is a flowchart of a process for providing information to an operator of the vehicle as to a level of engagement for the operator, and that can be implemented in connection with the system and vehicle of FIG. 1, the display of FIG. 2, and the conceptual framework of FIG. 3, in accordance with an exemplary embodiment

With reference to FIG. 4, a flowchart is provided for a process 400 for providing information to an operator of the vehicle as to a level of engagement for the operator, in accordance with an exemplary embodiment. The process 400 can be implemented in connection with the vehicle 100 and the control system 102 of FIG. 1, the displays 200, 202 of FIG. 2, and the conceptual framework 300 of FIG. 3, in accordance with an exemplary embodiment.

As depicted in FIG. 4, a destination entry is received (step 402). In one embodiment, the destination refers to a destination of choice for a current vehicle drive for the vehicle, as selected by the operator via engagement with the user interface 105 of FIG. 1.

Various data is obtained pertaining to the vehicle drive (step 404). In one embodiment, crowd-sourced monitoring and data analytics and historical information are obtained as part of the data of step 404. In various embodiments, the data includes various data pertaining to the vehicle operator's preferences and/or history (e.g. as to a general time for leaving for work or other destination, preferred routes, preferred levels of autonomous driving and/or driver engagement requirements at different times and/or locations, and so), as well as various data pertaining to the vehicle 100 (including operation of the autonomous driving functionality), the operator (e.g. driver) thereof, and the surrounding environment (e.g. roads, road conditions, traffic patterns, construction, weather, and so on), for example corresponding to the various inputs 302, 308, 310, and 340 of FIG. 3. Also in various embodiments, the data may also include real time traffic and/or incident report information from various sources, such as third party applications/apps, vehicle to infrastructure communications, and so on. In various embodiments, the data is collected via the various sensors 103, transceivers 104, user interface 105 of FIG. 1 and/or the various devices associated with the various types of inputs 302, 308, 310, and 340 of FIG. 3.

The levels of vehicle automation (and corresponding levels of required operator engagement) are calculated and predicted for each segment throughout the selected route(s) to the destination (step 406), using the various data of step 404. In various embodiments, the determinations of step 406 are made by the processor 172 of FIG. 1 onboard the vehicle 100. In one embodiment, the levels of operator engagement correspond to the various color-coded levels described above in connection with the displays 200, 202 of FIG. 2. For example, in various embodiments, if weather and/or other road conditions are less than ideal, or if there is construction, heavy traffic, vehicle back-ups, road blockages, road slowing, stops, and/or other possible issues pertaining to a particular route, then such factors may require additional and/or heightened levels of engagement by the operator. In various embodiments, different mechanisms may be utilized, for example between the outside road environment and automation level. In certain embodiments, one fundamental factor which determines the automation level comprises the sensing capability in different conditions. For example, in certain embodiments, the sensing capability of lidar sensors in snowing weather conditions may be utilized. With the evolving of sensing capability, the automation level will change in a certain road condition.

In addition, in certain embodiments, driver state monitoring is utilized in step 408 to suggest a level of automation based on a driver state and/or driver preferences. For example, in certain embodiments, driver monitoring (e.g. using the motion sensors 322, internal cameras 326, eye/head sensors 327, steering wheel sensors 328 of FIG. 3 and/or other sensors 103 of FIG. 1) may be used to monitor a current level of alertness of the driver. For example, in certain embodiments, if the operator has his or her eyes closed, is resting his or her head in a sleeping-type position, and/or has eyes that are not presently and/or actively focusing on the road, then this may indicate that the driver is not particularly alert. By contrast, in certain embodiments, if the operator has his or her eyes open and shows eye and body movement that are actively focused on the road, then then this would indicate that the driver is relatively more alert, and so on. In certain other embodiments, various other sensor data (e.g., heart rate sensors, other sleeping detection sensors, and so on, for example from a smart watch or other computer device) may similarly be utilized for monitoring an alertness of the driver. In addition, the history and/or preferences of step 404 may also be used to analyze expected driver preferences for the level of autonomous driving (and associated required level of driver engagement) during various segments of the vehicle drive. In certain embodiments, data from other sensors and/or sources may also be utilized, such as, by way of example, a pressure sensor on a driver's seat to monitor driver's sitting position and movement frequency, (e.g., which may comprise indicators of the driver's drowsiness), and so on.

A consolidated view is provided for the operator (step 410). In one embodiment, the consolidated view of step 410 includes a display of different levels of engagement that are expected along the route (according to the determinations of step 406). In certain embodiments, the consolidated view also incorporates the driver state and/or preferences of step 408.

For example, by suggested alternate routes that may better comport with the driver's state or preferences (step 412). By way of example, in one embodiment, if a driver currently appears to be drowsy or relatively unresponsive, then an alternate route may be proposed and/or selected in which little or no driver engagement may be required for at least a desired period of time. By way of additional example, if a particular driver generally prefers to have a relatively low or high level of engagement during a particular part of the drive (e.g. at the beginning), then the route may be adjusted accordingly to meet the driver's preferences, and so on.

In one embodiment, such alternate routes are displayed as selections options for the driver, and the driver may select such an alternate route accordingly (step 414). The process then returns to the above-referenced steps 404 and 406, as depicted in FIG. 4 and discussed above. In certain embodiments, the route recommendations are actively prompted to the driver through the in-vehicle infotainment system, and a request is made asking for the driver's confirmation.

In one embodiment, an analysis of possible routes determines the most appropriate route for extended automatic driving segments that is most beneficial to the state of the driver. A driving preview of upcoming automated events along the route is presented to the driver. This forecast eliminates transition "surprises" and leads to an automated driving experience that promotes safety and better human/vehicle driving transitions.

Also in one embodiment, drivers are provided with a preview of automation levels and preview of drivers' responsibility on each road segment along a navigation route (or any time when not in a route), for automated vehicles. This method considers factors such as road conditions (e.g., lane marker visibility, lanes, present of other vehicles), weather conditions (e.g., snowing) and recorded other vehicles' automation system performance data. Also in one embodiment, drivers are provided with a method of selecting a schedule of preferred automation. In addition, in one embodiment, the most relevant options may be provided to the user (e.g. driver) using adaptive to variant environment and driver state information, as well as asking for the driver's confirmation.

In addition, in certain embodiments, forecasting may be provided of automation at the destination (e.g. at the end of the drive). More specifically, in one embodiment, this could entail a forecast of automated parking availability and location. In one embodiment, automated parking occurs at near zero speeds, and such automatic parking forecasting could be offered to the driver as a forecast element that the driver selects arrival; which may in turn influence the driver's actions/choices during the earlier automation preview.

In addition, in certain embodiments, data may be provided to the operator after reaching the destination (e.g. after parking the vehicle). In certain embodiments, a history regarding the level of automation (and corresponding level of required operator engagement) may be provided to the operator at the end of or after the vehicle drive, for example to suggest possible alternatives for the next vehicle drive (e.g. possibly leaving earlier or later, or taking a different route, which could influence the level of operator engagement and tailor the route more specifically to the operator's preferences).

Accordingly, methods, systems, and vehicles are provided for providing information for operator engagement for vehicles with autonomous driving functionality. In various embodiments, various parameters are used to predict future levels of operator engagement along a path to a destination, and the information is provided to the driver or other operator of the vehicle.

In accordance with various embodiment, the disclosed methods, systems, and vehicles provide the operator (e.g. driver) a preview of expected upcoming vehicle automation level and his/her engagement level on a specific road segment. In addition, in various embodiments, the disclosed methods, systems and vehicles provide the driver an indicator of their "work" schedule for the entire trip considering road conditions, weather conditions, and performance data from other vehicles' automation system performance data. In addition, in various embodiments, the disclosed methods, systems and vehicles provide the driver with a method of selecting a schedule of preferred automation. Moreover, in various embodiments, the disclosed methods, systems and vehicles provide an adaptive to variant environment and driver state to present the most relevant options to the user (e.g. the driver) of the vehicle.

The disclosed systems and methods may be advantageous, for example, in improving cooperation between drivers and the automation system and thereby increase safety; providing the drivers an indicator of their responsibilities and "work" schedules for the entire trip; providing a more gradual way to bring drivers into the loop by presenting future vehicle control transitions; potentially using the automation level information for other purposes such as route selection; allowing the driver to select schedules/routes with more or less automation based on current conditions (e.g., fastest, shortest, cheapest, and so on); monitoring the available automation schedules that become available during the vehicle drive or drive; and in helping to manage the driver's and/or passenger's expectations.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. It will similarly be appreciated that the displays 200, 202 may differ from that depicted in FIG. 2. In addition, it will be appreciated that conceptual framework 300 and process 400 may differ from those depicted in FIGS. 3 and 4, respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising:
    obtaining inputs pertaining to conditions of a plurality of potential routes to reach an operator-requested destination planned for a vehicle having autonomous operation capability, wherein the obtaining inputs comprises obtaining inputs pertaining, for each potential route, to a plurality of conditions of the potential route, wherein the plurality of conditions relate to a level of automated driving expected for the potential route;
    predicting, via a processor, a future level of engagement required for an operator of the vehicle, for each of the plurality of potential routes, based on the level of automated driving expected for the potential route, using the inputs;
    obtaining sensor data, from one or more sensors, pertaining to the operator of the vehicle;
    monitoring a level of awareness of the operator of the vehicle, via the processor, based on the sensor data; and
    providing, for the operator, information relating, for each of the plurality of potential routes, (a) the future level of engagement required for the operator with (b) the level of awareness of the operator of the vehicle.

2. The method of claim 1, wherein the obtaining inputs includes, for each of the plurality of potential routes, crowd-source monitoring for the potential route.

3. The method of claim 1, wherein the obtaining inputs includes obtaining, for each of the plurality of potential routes, data analytics for the potential route.

4. The method of claim 1, wherein the obtaining inputs includes obtaining, for each of the plurality of potential routes, historical information for the potential route.

5. The method of claim 1, wherein the obtaining inputs comprises obtaining, for each of the plurality of potential routes, a user history for the operator of the vehicle with respect to the operator's preferences.

6. The method of claim 1, wherein the obtaining inputs includes, for each of the plurality of potential routes, obtaining road conditions for the potential route.

7. The method of claim 1, further comprising:
selecting a preferred route of the plurality of potential routes, based on a comparison of (a) the level of awareness of the operator of the vehicle with (b) the future level of engagement required for the operator of the vehicle, for each of the plurality of potential routes.

8. The method of claim 1, further comprising:
selecting a plurality of preferred routes of the plurality of potential routes, based on a comparison of (a) the level of awareness of the operator of the vehicle with (b) the future level of engagement required for the operator of the vehicle, for each of the plurality of potential routes; and
providing a visual display, inside the vehicle, of the plurality of preferred routes for the operator of the vehicle.

9. The method of claim 1, wherein each of the plurality of potential routes comprises a plurality of segments, and the method further comprises:
predicting, via the processor, for each segment of each of the plurality of potential routes, a respective future level of engagement required for the operator of the vehicle for the segment, based on a respective level of automated driving expected for the segment.

10. The method of claim 9, wherein the providing of the information comprises, for a respective potential route, visually presenting the respective future levels of engagement required for the operator of the vehicle for each of the plurality of segments of the potential route in different colors, with each color representing a different future level of engagement required for the operator.

11. The method of claim 10, wherein each color represents a different level of autonomous operation for the autonomous vehicle.

12. The method of claim 10, wherein the providing of the information comprises, for a respective potential route, visually presenting the respective future levels of engagement required for the operator of the vehicle for each of the plurality of segments of the potential route embedded within a visual presentation of a map of the potential route.

13. The method of claim 10, wherein the providing of the information comprises, for a respective potential route, visually presenting the respective future levels of engagement required for the operator of the vehicle for each of the plurality of segments of the potential route via a linear presentation with respect to a distance to be travelled along the potential route.

14. The method of claim 1, further comprising:
receiving inputs from the operator as to a preferred schedule for multiple levels of automation for operating the vehicle at different points in time; and
determining a selected route of the potential routes based on a comparison of (a) the preferred schedule from the operator, with (b) the respective future levels of engagement required for the operator of the vehicle for each of the segments of each of the potential routes as predicted via the processor.

15. The method of claim 14, wherein the selected route is determined so as to match a desired level of automation for operating the vehicle at a particular time, per the preferred schedule from the operator, with the respective future level of engagement required for the operator of the vehicle at the particular time, per the predictions via the processor of the respective future levels of engagement required for the operator of the vehicle for each of the segments of each of the potential routes.

16. The method of claim 1, wherein:
the operator is disposed inside the vehicle; and
the step of providing the information comprises, providing, for the operator, on a visual display inside the vehicle, information relating, for each of the plurality of potential routes, (a) the future level of engagement required for the operator with (b) the level of awareness of the operator of the vehicle.

17. A system comprising:
an input unit configured to at least facilitate:
obtaining inputs pertaining to conditions of a plurality of potential routes to reach an operator-requested destination planned for a vehicle having autonomous operation capability;
a sensor unit configured to at least facilitate:
obtaining sensor data pertaining to an operator of the vehicle via one or more sensors; and
a processor configured to at least facilitate:
predicting a future level of engagement required for the operator of the vehicle, for each of the plurality of potential routes, based on the level of automated driving expected for the potential route, using the inputs;
monitoring a level of awareness of the operator of the vehicle based on the sensor data; and
providing, for the operator, information relating, for each of the plurality of potential routes, (a) the future level of engagement required for the operator with (b) the level of awareness of the operator of the vehicle.

18. The system of claim 17, wherein the input unit is configured to at least facilitate, for each of the plurality of potential routes, crowd-source monitoring for the potential route.

19. The system of claim 17, wherein the input unit is configured to at least facilitate, for each of the plurality of potential routes, obtaining historical information for the potential route, along with a user history for the operator of the vehicle with respect to the operator's preferences.

20. A vehicle comprising:
a propulsion system having autonomous operation capability;
an input unit configured to at least facilitate:
obtaining inputs pertaining to conditions of a plurality of potential routes to reach an operator-requested destination planned for a vehicle having autonomous operation capability;
a sensor unit configured to at least facilitate:
obtaining sensor data pertaining to an operator of the vehicle via one or more sensors; and
a processor configured to at least facilitate:
predicting a future level of engagement required for the operator of the vehicle, for each of the plurality of potential routes, based on the level of automated driving expected for the potential route, using the inputs;
monitoring a level of awareness of the operator of the vehicle based on the sensor data; and
providing, for the operator, information relating, for each of the plurality of potential routes, (a) the future level of engagement required for the operator with (b) the level of awareness of the operator of the vehicle.

* * * * *